US010661760B2

(12) United States Patent
Giraud et al.

(10) Patent No.: US 10,661,760 B2
(45) Date of Patent: May 26, 2020

(54) SYSTEM FOR CLEANING A GLASS SURFACE OF A VEHICLE

(71) Applicant: Valeo Systémes d'Essuyage, Le Mesnil Saint Denis (FR)

(72) Inventors: Frédéric Giraud, Le Mesnil Saint Denis (FR); Christophe Le-Ligne, Le Mesnil Saint Denis (FR)

(73) Assignee: Valeo Systémes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 16/054,331

(22) Filed: Aug. 3, 2018

(65) Prior Publication Data
US 2019/0047521 A1    Feb. 14, 2019

(30) Foreign Application Priority Data

Aug. 9, 2017 (FR) ...................... 17 57611

(51) Int. Cl.
| | | |
|---|---|---|
| B60S 1/48 | (2006.01) | |
| H04B 3/54 | (2006.01) | |
| H04L 12/40 | (2006.01) | |
| B60S 1/52 | (2006.01) | |
| B60S 1/56 | (2006.01) | |

(52) U.S. Cl.
CPC ............... B60S 1/481 (2013.01); B60S 1/52 (2013.01); H04B 3/542 (2013.01); H04L 12/40 (2013.01); B60S 1/56 (2013.01)

(58) Field of Classification Search
CPC .... B60S 1/481; B60S 1/52; B60S 1/56; B60S 1/40; H04B 3/542; H04L 12/40
See application file for complete search history.

(56) References Cited

U.S. PATENT DOCUMENTS

| | | | | |
|---|---|---|---|---|
| 5,327,613 | A | * | 7/1994 | Ohtsu ................... B60S 1/3411 15/250.01 |
| 6,257,500 | B1 | * | 7/2001 | Petzold .................. B60S 1/481 239/284.1 |
| 9,333,950 | B2 | * | 5/2016 | Opel ....................... B60S 1/481 |
| 10,189,449 | B2 | * | 1/2019 | Sykula ................... B60S 1/485 |
| 2007/0209687 | A1 | * | 9/2007 | Fistler .................... B01D 35/02 134/111 |

(Continued)

FOREIGN PATENT DOCUMENTS

| | | |
|---|---|---|
| DE | 10115975 A1 | 10/2002 |
| FR | 2986877 A1 | 8/2013 |
| JP | 2014 037239 A | 2/2014 |

OTHER PUBLICATIONS

Machine translation of DE 10115975 A1 (Year: 2002).*

(Continued)

*Primary Examiner* — Thomas D Alunkal
(74) *Attorney, Agent, or Firm* — Osha Liang LLP

(57) ABSTRACT

A system (2) for cleaning at least one glazed surface (20, 21) of a vehicle (1) comprises a hydraulic distribution bus (3), able to allow a cleaning product to flow from a storage tank, and at least two devices (100 to 111) for projecting the cleaning product onto the at least one glazed surface (20, 21). According to the invention, the at least two projection devices (100 to 111) are linked by hydraulic connection elements to the hydraulic distribution bus (3), independently of one another and in successive areas of said hydraulic distribution bus (3).

9 Claims, 2 Drawing Sheets

(56) References Cited

U.S. PATENT DOCUMENTS

Figure 1:
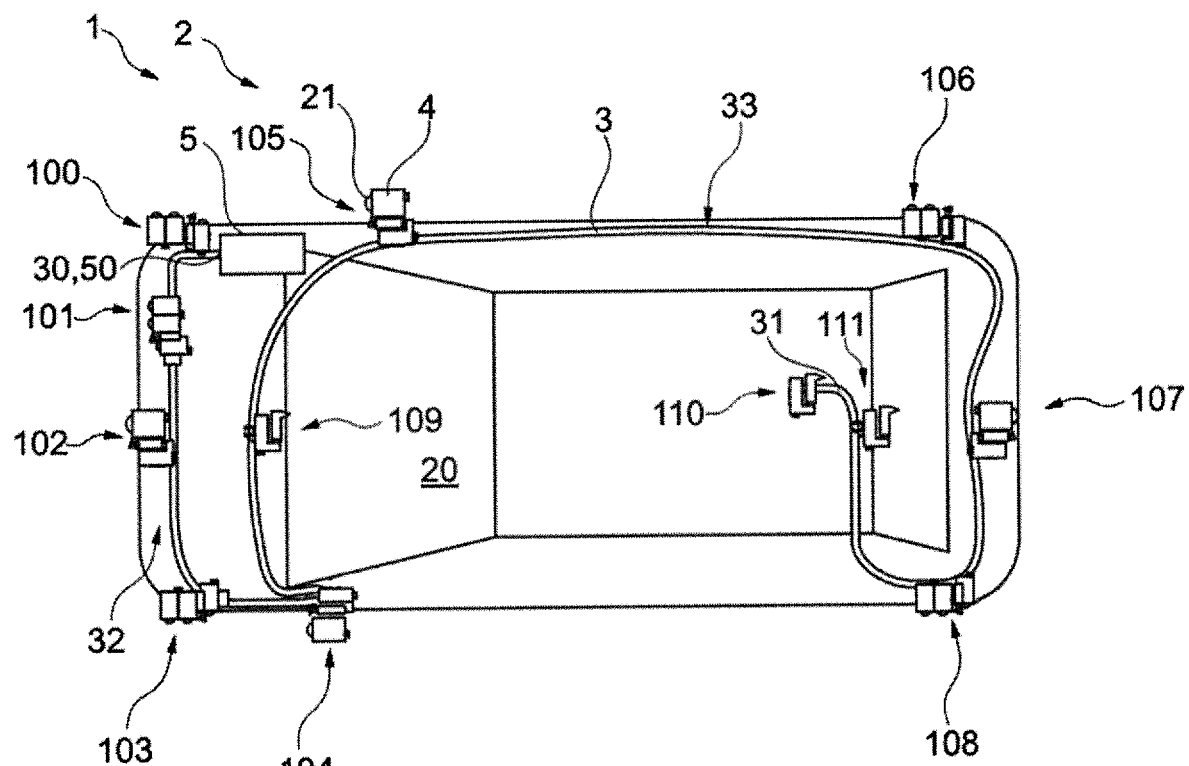

2012/0266926 A1* 10/2012 Kikuta .................... B60S 1/481
134/58 R
2016/0016537 A1* 1/2016 Schaeuble ................ B60S 1/40
15/250.04
2017/0066415 A1* 3/2017 Waible .................. B60S 1/3862

OTHER PUBLICATIONS

Preliminary Search Report and Written Opinion issued in corresponding French Application No. 1757611, dated Apr. 16, 2018 (6 pages).

* cited by examiner

SYSTEM FOR CLEANING A GLASS SURFACE OF A VEHICLE

The invention relates to the field of cleaning systems fitted on motor vehicles. It relates more particularly to the field of systems for cleaning a glazed surface of such vehicles.

Document US2012/266926 describes an architecture of a cleaning system including a plurality of devices for projecting a cleaning product. These projection devices are positioned on the front face and/or on the rear face and/or on a rear-view mirror of the vehicle so as to allow an associated glazed surface to be cleaned.

In such cleaning systems, first projection devices may be actuated by a manual command triggered by a user of the vehicle, and second projection devices may be actuated by an automatic command triggered by a driving-assistance and/or manoeuvring-assistance device of this vehicle. The glazed surfaces associated with the first projection devices correspond for example to the windscreen and to the rear window of the vehicle, whereas the glazed surfaces associated with the second projection devices correspond for example to the optical surfaces of sensors intended to assist in the driving and/or in the manoeuvring of the vehicle.

To supply these projection devices with cleaning product, the architecture of the cleaning system in the document cited includes a tank and a pump that are linked to each of these projection devices via a main solenoid valve routing the cleaning product supplied by the pump to lines that are respectively associated with each of the projection devices of the vehicle. Thus, in this architecture, the projection devices are supplied by the pump of the cleaning system separately from one another, the driving of the solenoid valve directing the cleaning product pumped from the tank to one or the other of the lines.

When a cleaning system of the vehicle includes a large number of projection devices supplied by one and the same pump, the number of lines to be provided in order to link all the projection devices hydraulically is high, and may cause problems in terms of installation complexity and cost. Each of the hydraulic lines has for example a cost per metre that greatly increases the overall cost of the cleaning system.

Moreover, each of the projection devices has to be linked electrically to a main electronic unit for controlling the cleaning function, and for example triggering the cleaning function and/or implementing deployment of the projector in order to perform this cleaning function. Again, to allow each of the projection devices to be linked electrically to the main electronic unit, it is necessary to provide a cleaning system including a large number of cables and electrical connections. A layout in which a cable is inserted between the main electronic unit and each of the projection devices again represents a cost per metre that is decisive in the overall cost of the cleaning system.

In a context of developing vehicles, for example self-driving vehicles, in which the number of sensors is becoming increasingly high on the periphery of the vehicle, it is understood that these drawbacks have to be taken into consideration.

The aim of the present invention is to mitigate at least one of the abovementioned drawbacks and to propose a cleaning system that is fitted on a vehicle and makes it possible to reduce the manufacturing cost thereof, while at the same time simplifying installation thereof in the vehicle.

To this end, the subject of the invention is a system for cleaning at least one glazed surface of a vehicle comprising a main hydraulic distribution bus able to allow a cleaning product to flow from a storage tank, and at least two devices for projecting the cleaning product onto the at least one glazed surface. According to the invention, the at least two projection devices are linked by hydraulic connection elements to the hydraulic distribution bus, independently of one another and in successive areas of said bus.

The following definitions are given:
'hydraulic distribution bus' is understood to mean a line allowing the cleaning product to be conveyed.
'cleaning product' is understood to mean a liquid or gaseous product able to be projected onto a glazed surface for the purpose of cleaning it, such a product being able to be, indiscriminately in the present invention, water, windscreen washer fluid, or even air,
'glazed surface' is understood to mean a transparent surface able to be one of the glazings in the passenger compartment of the vehicle and in particular a windscreen or a rear window, on the one hand, or an optical surface of an optical detection system fitted on the vehicle, on the other hand; in particular, it may be provided that the glazed surface is made of glass or else of a transparent plastic of Plexiglas type.

According to the invention, it is noteworthy that the projection devices are connected to the supply line for the cleaning product independently of one another, that is to say with hydraulic connection elements, for example secondary lines of short length in comparison with the main hydraulic line and that are specific to each projection device and are connected to the main hydraulic line at connection points that are offset with respect to one another.

By virtue of the cleaning system according to the invention, it is possible to substantially reduce the overall cost of installing such a cleaning system in the vehicle. Specifically, in contrast to the architecture of known cleaning systems, just one hydraulic line is used to hydraulically supply each of the projection devices fitted on a vehicle, the hydraulic line thus forming a distribution bus that the distribution devices use according to the cleaning requirement. These two projection devices are each linked hydraulically to this same hydraulic line along the latter such that each of these projection devices is able to be fed with cleaning product by the main hydraulic line independently of one another. It is understood that the cleaning system according to the invention is all the more beneficial when it includes a large number of projection devices, connected respectively to one and the same main hydraulic line, at a distance from one another along this main hydraulic line running along the vehicle.

It is thus noteworthy, according to the invention, that the hydraulic circuits of a cleaning system fitted on a vehicle are greatly simplified. Specifically, according to the invention, the main hydraulic line performs the role of a hydraulic distribution bus, going along the vehicle so as to hydraulically supply each of these projection devices fitted on the vehicle. The size of the secondary hydraulic lines, which are able to form the connection elements specific to each projection device, is small, and the constraints for attaching the hydraulic circuit thus relate above all to the main hydraulic line, which is shared by each projection device. This advantageously makes it possible to optimize the bulk, in the vehicle, of the hydraulic circuits for such cleaning systems.

Moreover, the hydraulic lines are attached regularly to structural elements of the vehicle by fasteners, be this along or through walls defining the passenger compartment for example, and it is understood that reducing the total length of the (primary and secondary) lines makes it possible to reduce the number of these fasteners, and therefore the cost of the components to be provided for the installation of the cleaning system in the vehicle and the time necessary to install this system.

According to one particular feature of the invention, the cleaning system comprises a single hydraulic distribution bus and the projection devices are attached directly to this hydraulic distribution bus, the connection element specific to each projection device consisting of a protrusion of the projection device into the hydraulic distribution bus. By virtue of this feature, it is possible to simplify even further the hydraulic circuits of a cleaning system fitted on a vehicle and running through the vehicle in order to hydraulically supply each of the projection devices of this vehicle.

According to one embodiment of the invention, the hydraulic distribution bus forms an open hydraulic circuit. In other words, the cleaning product flowing in the hydraulic distribution bus is at a substantially different pressure between a first end, linked to an output of the pump, of the hydraulic distribution bus and a second end, which is closed and opposite the first end, of the hydraulic distribution bus, this being the case when all of the projection devices linked to this hydraulic distribution bus are actuated.

It is possible to contemplate the hydraulic distribution bus forming a closed hydraulic circuit. In other words, the cleaning product flows in a closed loop and thus has a virtually constant pressure at the input and at the output of the hydraulic distribution bus, this being the case when all of the projection devices linked to this hydraulic distribution bus are actuated.

According to one feature of the invention, the cleaning system comprises a pump able to supply the hydraulic distribution bus with cleaning product. In particular, the pump may supply the hydraulic distribution bus by drawing cleaning product from a tank storing this product. When the hydraulic distribution bus forms a closed hydraulic circuit, a first end of the hydraulic distribution bus is linked to an output of the pump and a second end, opposite the first end, of the hydraulic distribution bus is linked to an input of the pump.

According to one feature of the invention, the hydraulic distribution bus comprises at least two portions arranged on either side of a wall and linked to one another by a hydraulic connector. This embodiment makes it possible to hydraulically link two portions of the hydraulic distribution bus extending along the vehicle and forming, according to the invention, the main distribution line, these two portions being separated by a wall of the vehicle. The hydraulic connector may be installed in an aperture formed in this wall. Such a wall may be made of metal or plastic and corresponds to a wall on the distribution path of the hydraulic distribution bus running along the vehicle in order to feed the projection devices.

One end of each portion of the hydraulic distribution bus, these ends being intended to be connected to one another, may bear a hydraulic connection port for its connection to the hydraulic connector.

In this main distribution line context, the at least two projection devices may in particular be linked to one and the same portion of the hydraulic distribution bus, or be linked respectively to different portions of the hydraulic distribution bus. In particular, it may be provided that the distribution devices are arranged such that each portion of the hydraulic distribution bus feeds at least two distribution devices.

According to one feature of the invention, the hydraulic connection elements specific to each projection device are formed by syringes that are intended to pierce the hydraulic distribution bus. Syringe is understood to mean a tube joined to the projection device and bearing, at its free end, a point that is configured to pierce the main hydraulic line forming the distribution bus, the tube being hollow so as to form a secondary hydraulic line tapped off from the hydraulic distribution bus in order to supply the cleaning device.

According to one feature of the invention, at least one of the projection devices comprises elements for mechanical holding on the hydraulic distribution bus. It will be understood that each of the projection devices may be attached to the hydraulic distribution bus by a mechanical holding element that is specific thereto. Such mechanical holding elements make it possible to use the hydraulic distribution bus to bear the projection devices.

According to one feature of the invention, each of the projection devices comprises a solenoid valve and a sprinkler.

According to one feature of the invention, the hydraulic connection element and the mechanical holding element of a projection device are borne by the solenoid valve of this projection device. Such a solenoid valve may advantageously be linked mechanically and hydraulically to the hydraulic distribution bus in one and the same assembly operation.

The sprinkler may be fixed or else telescopic. In other words, the projection device is configured so that the bus(es) for projecting the cleaning product keep a fixed position during and between the cleaning operations, or else that these projection buses are installed on a telescopic body able to adopt a cleaning position facing the glazed surface to be cleaned and a retracted position.

According to one feature of the invention, at least one of the projection devices is associated with an optical detection system and the projection device and the associated optical detection system are housed in a common housing.

Such an optical detection system may be an optical sensor of video camera or else laser scanner type, necessary to allow a driving-assistance and/or manoeuvring-assistance device of the vehicle to operate. The glazed surface of these sensors is then an optical surface formed by protective glass that is exposed to bad weather.

In this particular context of the presence of a common housing, the hydraulic connection element and the mechanical holding element of a projection device with respect to the hydraulic distribution bus may be borne by the housing. The housing, fitted beforehand with the projection device and with the sensor, may then be linked mechanically and hydraulically to the hydraulic distribution bus. The housing then forms a mechanical and hydraulic connection interface between the hydraulic distribution bus and the corresponding projection device.

According to one feature of the invention, the cleaning system comprises an electronic control bus, the at least two projection devices being linked electrically to the electronic control bus independently of one another.

Each projection device may thus be configured to include an element for hydraulic connection to a hydraulic distribution bus, which is moreover common to all of the projection devices, and an element for electrical connection to an electronic control bus, which again is advantageously common to all of the projection devices.

A contribution is thus made to reducing the overall cost of such a cleaning system even further. Specifically, in contrast to the architecture of known cleaning systems, only one electronic control bus is used to control the at least two projection devices fitted on the vehicle. According to one feature of the invention, the electronic control bus may follow the path of the hydraulic distribution bus running along the vehicle in order to electrically control each of these projection devices fitted on the vehicle. This advantageously makes it possible to optimize the bulk, in the vehicle, that is dedicated to the electrical circuits for such cleaning systems. In practice, the electronic control bus, which has to be attached regularly to the structural elements of the vehicle by fasteners, may share the attachment fasteners of the hydraulic distribution bus.

According to various modes of implementation of the invention, it may be provided that the electronic control bus is a bus that operates with a powerline communication (PLC) protocol, or else the communication protocol is of LIN or CAN type.

It will be understood that the electronic driving unit for a solenoid valve is configured to process a command transmitted by the electronic control bus depending on the type of electronic control bus that is contemplated.

According to another feature of the invention, the solenoid valve of the projection device comprises an electrical connection terminal that is intended to be linked to the electronic control bus, the solenoid valve comprising an electronic driving unit for controlling it. When an automatic cleaning control order is received by the solenoid valve via the electronic control bus, said solenoid valve is then able to allow the cleaning product to flow from the hydraulic distribution bus to the sprinkler in order to project it onto the glazed surface that is associated therewith.

More particularly, the electrical connection terminal includes three connection pins that are configured to interact with three wires, namely two electric power supply wires and an electronic control wire.

The two power supply wires make it possible to link the solenoid valve of the corresponding projection device to a power source of the vehicle, for example a low-voltage network of 12 V type, whereas the electronic control wire makes it possible to link the solenoid valve of the corresponding projection device to the electronic control bus.

When the electronic control bus is a PLC bus, it may be provided that the electrical connection terminal includes just two pins for interacting with the two single electric power supply wires of the PLC bus, it being understood that the principle of powerline technology makes it possible to transport an item of control information to the electronic driving unit for the solenoid valve by way of a frequency of the electric current of the power supply network.

Advantageously, the main hydraulic line is flexible. In other words, the hydraulic distribution bus is made of an elastic material allowing the main hydraulic line to follow the forms and profiles of the structural elements of the vehicle against which it has to run.

According to one particular embodiment of the invention, the electronic control bus and the hydraulic distribution bus form one and the same electric and hydraulic distribution bus for the projection devices. The projection devices are connected separately from one another to this electric and hydraulic distribution bus. In other words, the electronic control bus is formed jointly with the hydraulic distribution bus. By virtue of this particular embodiment, it is possible to further simplify the assembly of the cleaning system in the vehicle.

In this context, the main hydraulic line forming the hydraulic distribution bus may be formed of an extruded tube having, in the centre of the tube, a central channel within which the cleaning product is able to flow and that has, on the periphery of the tube, additional lines within which each of the power supply and control wires of the electronic control bus are able to run. As a variant, the additional lines receiving the electronic control bus may be overmoulded on the tube associated with the hydraulic distribution bus.

According to one feature of the invention, a power supply network for the projection devices, the electronic control bus and the hydraulic bus form a single electric and hydraulic distribution bus for the projection devices. In other words, the power supply network for the projection devices and the electronic control bus are formed jointly with the hydraulic distribution bus. It will then be understood that such a distribution bus makes it possible to hydraulically supply the projection devices via the hydraulic distribution bus, to electrically supply these projection devices via the power supply network, and to control these same projection devices via the electronic control bus. Again, the design and the installation of the assembly in the vehicle is thus simplified, with a circuit common to all of the projection devices that extends along the vehicle and to which the projection devices are connected independently of one another, in particular with areas of connection to this common circuit that are situated at a distance from one another, this being the case for a circuit that allows both hydraulic and electrical distribution.

As has been described above, it is possible to contemplate that the power supply network for the projection devices and the electronic control bus are positioned peripherally with respect to the main hydraulic line.

Moreover, a variant embodiment may be provided according to which the electronic control bus and/or the power supply network are arranged in the centre of the main hydraulic line. It will then be understood that the hydraulic distribution bus has an annular section for receiving, in the centre thereof, in a coaxial arrangement, the electronic control bus and/or the power supply network for the projection devices. In this case, it is understood that the single electric and hydraulic distribution bus for the projection devices is configured so that protrusions are provided regularly throughout the tube defining the main hydraulic line so as to allow the electrical connection of the projection devices.

According to the particular embodiment in which the electronic control bus and the hydraulic distribution bus form one and the same electric and hydraulic distribution bus for the projection devices, the electric and hydraulic distribution bus may comprise at least two portions that are linked to one another by an electrical and hydraulic connector. This particular embodiment makes it possible to electrically and hydraulically link two portions of the distribution bus that are separated by a wall of the vehicle, such as described above. The electrical and hydraulic connector may be installed in an aperture formed in this wall. One end of each portion of the hydraulic distribution bus, these ends being intended to be connected to one another, may hence bear an electrical and hydraulic connection port for its connection to the electrical and hydraulic connector.

According to other features of the invention, it may be provided that at least one first projection device is intended to clean an optical surface of a sensor used for automatic analysis of the road scene, that is to say analysis using the electronics of the vehicle in order in particular to drive a driving-assistance and/or manoeuvring-assistance device of this vehicle, and that at least one second projection device is intended to clean a glazed surface of the passenger compartment or an optical surface of a sensor used only for direct analysis by the driver of the vehicle. In this case, it is advantageous for the hydraulic distribution bus to be arranged such that the at least one second projection device is positioned on the hydraulic distribution bus, common to each of the projection devices, so as to be further away from an output of the pump supplying this hydraulic distribution bus than the at least one first projection device is.

Specifically, in particular when the hydraulic distribution bus common to all of the projection devices is an open circuit, it is understood that the cleaning product flowing at the end, furthest away from the pump, of this open circuit may exhibit a pressure lower than that of the cleaning product flowing at the pump output. Now, it is important for optical detection systems associated with driving-assistance systems to be spotless in order to avoid incorrect analysis of the road scene detected by the on-board electronics of the vehicle, whereas if the driver analyses the detected image of the road scene himself, he is better prepared to analyse the partially tainted image without making an error in judgement. Hence, it is advantageously possible to situate the second projection device on a portion of the hydraulic distribution bus where the pressure is lower, the potential risk of non-optimal cleaning having less of an impact. Moreover, by thus prioritizing the hydraulic supply of cleaning product for first and second projection devices, that is to say by situating them such that they are reached more or less rapidly by the cleaning product at the pump output, it is possible to avoid non-essential cleaning action from detracting from the triggering or the effectiveness of an action essential for the automatic processing of the information coming from the optical detection systems.

It is understood from the above text that it is advantageous according to the invention that, in a vehicle, a plurality of projection devices are supplied hydraulically, and where appropriate electrically, by a distribution bus common to all of these projection devices. It is possible in particular to have a single hydraulic distribution bus running along the vehicle.

According to one variant, it may be provided that the cleaning system comprises two separate hydraulic distribution buses and two separate series of projection devices, each series of projection devices being linked hydraulically to one of the hydraulic distribution buses in accordance with what was described above, that is to say to all of the projection devices of this series that are connected to the corresponding distribution bus independently of one another.

It may be provided for example to arrange a first hydraulic distribution bus and the corresponding first series of projection devices in a first part of a vehicle and the second hydraulic distribution bus and the corresponding second series of projection devices in a second part of a vehicle. By way of nonlimiting example, the first part of the vehicle may be one of the lateral parts of the vehicle and the second part may be the other of the lateral parts of the vehicle, or else the first part of the vehicle may be a front part of the vehicle and the second part may be a rear part of the vehicle.

In this context, another possible distribution is that each of the projection devices of the first series is intended to clean an optical surface of a sensor used for automatic analysis of the road scene, and that each of the projection devices of the second series is intended to clean a glazed surface of the passenger compartment or an optical surface of a sensor used only for direct analysis by the driver of the vehicle. It is then beneficial for the projection devices of the first series to be supplied hydraulically with cleaning product separately from the projection devices of the second series. By distinguishing the hydraulic supply of cleaning product for each of the first and second series of projection devices, it is possible to trigger a cleaning command for the first or the second series without impairing the triggering of a cleaning command for the other series.

When the cleaning system comprises a first series of projection devices that is linked hydraulically to a first hydraulic distribution bus and a second series of projection devices that is linked hydraulically to a second hydraulic distribution bus, one and the same pump may be provided for hydraulically supplying each of the first and second hydraulic distribution buses with cleaning product. It is also contemplated that a first pump is able to supply the first hydraulic distribution bus with cleaning product and that a second pump is able to supply the second hydraulic distribution bus with cleaning product. In this case, each of the pumps may be linked to the same container or each to a separate container.

Figure 2:
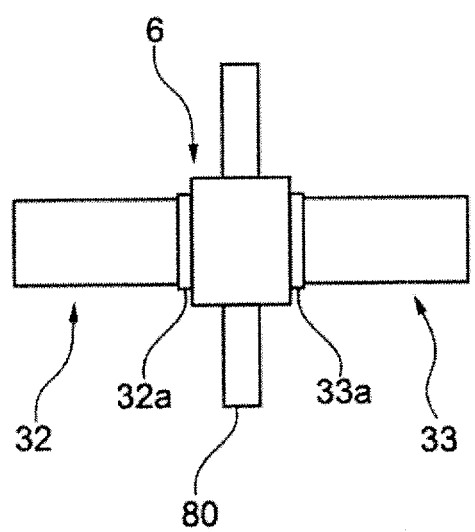
Figure 3:
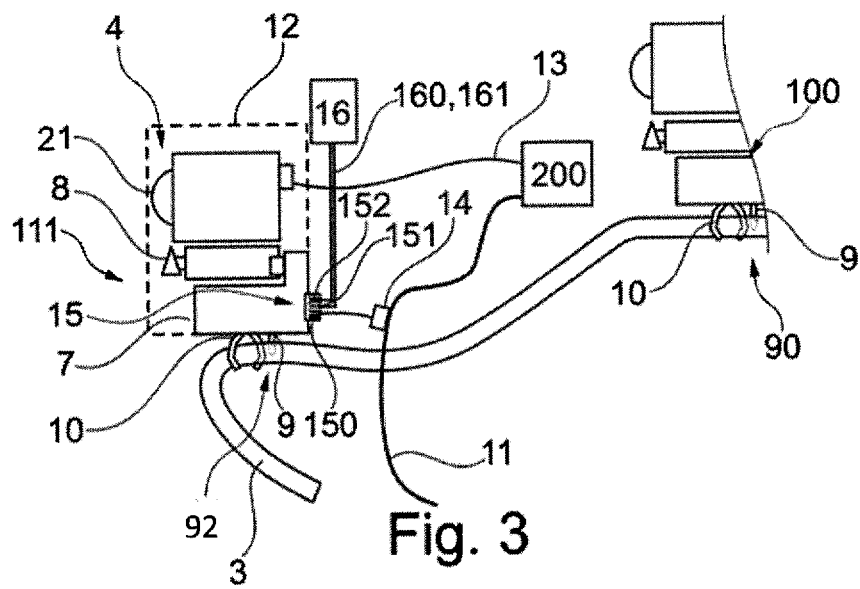
Figure 4:
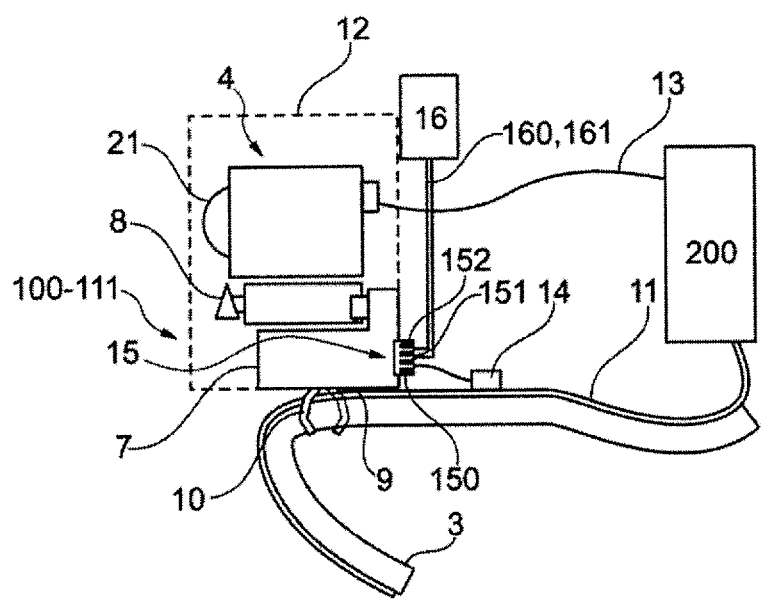
Figure 5:
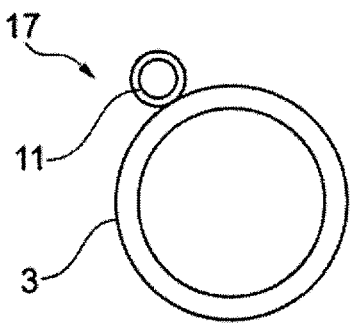

Further features, details and advantages of the invention will become more clearly apparent from reading the description given below by way of illustration and with reference to the drawings, in which:

FIG. 1 illustrates a schematic view of a motor vehicle fitted with a cleaning system according to the invention comprising a hydraulic distribution bus running through the vehicle in order to distribute a cleaning product to projection devices of the cleaning system that are installed in various areas of the vehicle, close to optical detection systems of the vehicle, FIG. 2 illustrates a schematic view of a structural wall of the vehicle housing a hydraulic connector configured to link two portions of the hydraulic distribution bus shown in FIG. 1, FIG. 3 illustrates a schematic view of one embodiment of the invention in which two of the cleaning product projection devices are linked hydraulically to the hydraulic distribution bus, on the one hand, and electrically to an electronic control bus, on the other hand, the hydraulic distribution bus and the electronic control bus being separate from one another, FIG. 4 illustrates a schematic view of another embodiment of the invention in which the hydraulic distribution bus and the electronic control bus form one and the same electric and hydraulic distribution bus, FIG. 5 is a schematic depiction of the section of the electric and hydraulic distribution bus illustrated in FIG. 4.

FIG. 1 shows a motor vehicle 1 fitted with a cleaning system 2 according to the invention, allowing at least one glazed surface 20, 21 of the vehicle 1 to be cleaned. Such a glazed surface may be for example a windscreen 20 or else a rear window of the vehicle, or it may be an optical surface 21 of an optical detection system 4 fitted on the vehicle 1.

The cleaning system 2 comprises a hydraulic flow line 3 able to allow a cleaning product to flow and devices 100 to 111 for projecting the cleaning product that are positioned in the vehicle 1 so as to be associated respectively with the cleaning of a glazed surface 20, 21. In the example illustrated, a projection device is dedicated specifically to cleaning a single glazed surface, but it will be understood that a plurality of projection devices could be dedicated to cleaning one and the same glazed surface, for example the windscreen 20, without departing from the context of the invention, as long as a main hydraulic flow line forms a hydraulic distribution bus 3 to which a plurality of these projection devices is connected.

More particularly, according to the invention, each of the projection devices 100 to 111 is linked by connection elements to the hydraulic distribution bus 3, and these projection devices are linked to this hydraulic distribution bus independently of one another, and in separate and successive areas 90, 92 (visible in FIG. 1) of the hydraulic distribution bus that forms a bus common to the plurality of projection devices. In this nonlimiting embodiment, it will be understood that a single hydraulic distribution bus provides the supply of cleaning product to all of the projection devices 100 to 111 installed on this vehicle 1.

The cleaning system 2 moreover comprises a pump 5 and a cleaning product storage tank. The pump 5 is configured to recover the cleaning product from the storage tank and to supply the main hydraulic line continuously with cleaning product. More particularly, an output 50 of the pump 5 is linked to a first end 30 of the hydraulic distribution bus 3. The result of this is that the hydraulic distribution bus 3 extends along the vehicle from this first end 30 to a second end 31. In the example illustrated, the second end 31, opposite the first end 30, of the hydraulic distribution bus 3 is closed such that the hydraulic distribution bus 3 forms an open hydraulic circuit. Of course, the hydraulic distribution bus could be configured in such a way as to form a closed hydraulic circuit and the second end 31 of the hydraulic distribution bus could in this context be linked to the storage tank.

With reference to FIG. 1, first projection devices 100 to 108 are intended to clean an optical surface of a sensor used for automatic analysis of the road scene, that is to say analysis using the electronics of the vehicle in order in particular to drive a driving-assistance and/or manoeuvring-assistance device of this vehicle, and second projection devices 109 to 111 are intended to clean a glazed surface of the passenger compartment or an optical surface of a sensor used only for direct analysis by the driver of the vehicle. The hydraulic distribution bus 3 is configured, in this case, such that it is one of the second projection devices, in this case a device associated with cleaning the rear window, that is positioned at the end of the hydraulic distribution bus, at the second end 31 thereof, that is to say in the area of the distribution bus furthest away from the output 50 of the pump 5.

The hydraulic distribution bus 3 in this case has a first portion 32 arranged in the front part of the vehicle and a second portion 33 arranged in the passenger compartment, each portion winding in the corresponding part of the vehicle in order to distribute to all of the projection devices present in this part of the vehicle. It is understood that hydraulic continuity is achieved in this case between these two portions 32, 33, since a single pump 5 is provided on the distribution bus.

FIG. 2 shows a means for ensuring continuity between these portions 32, 33 of the hydraulic distribution bus 3 when said bus is routed so as to pass through one or more wall(s) 80 of the vehicle 1, doing this advantageously in order to optimize the path of the hydraulic distribution bus 3 in the vehicle 1 and thus reduce the length of line necessary to produce the hydraulic distribution bus 3 common to each projection device. In this case, the portions 32, 33 are linked in pairs to one another via a hydraulic connector 6. More particularly, a first portion 32 and a second portion 33 of the hydraulic distribution bus 3 each bear, at their ends facing one another, a hydraulic connection port 32*a*, 33*a* for their connection to the hydraulic connector 6. It may be provided that two projection devices 100 to 111 are linked to one and the same portion 32, 33 of the hydraulic distribution bus 3, or each to a different portion 32, 33 of the hydraulic distribution bus 3.

With reference to FIG. 3, a description will now be given in greater detail of the projection devices 100 to 111 of the cleaning system 2 and their interaction with the hydraulic distribution bus 3 common to at least two of these projection devices, as have been shown schematically in this FIG. 3. In the following text, it is provided that the projection devices all have the same shape in order to facilitate standardization of the cleaning system, but it is obviously possible to adjust the shape and the size of a cleaning device as necessary without departing from the context of the invention, as long as, in accordance with what has been described above, each projection device is connected hydraulically to the hydraulic distribution bus independently of the other projection devices.

A projection device 100 to 111 comprises a solenoid valve 7 and a sprinkler 8. When the solenoid valve 7 is actuated, it allows the cleaning product, flowing in the hydraulic distribution bus 3, to pass to the sprinkler 8. The cleaning product is then projected by the sprinkler 8 onto a glazed surface 20, 21 of the optical 3*o* detection system 4 associated with the projection device 100 to 111.

The projection device comprises a hydraulic connection element 9 for connecting it to the hydraulic distribution bus 3. The hydraulic connection element 9 has a form that is able firstly to pierce the hydraulic distribution bus 3 and able secondly to ensure the passage of the cleaning product from this distribution bus to the sprinkler 8. To this end, the connection element may have the tubular and tapered shape of a syringe. At the point of assembly of the hydraulic connection element 9 to the hydraulic distribution bus 3, a resin may be used to surround an area of contact between the hydraulic connection element 9 and the hydraulic distribution bus 3 in order to ensure that this area of contact is sealtight.

According to the invention, and as is visible in FIG. 3, two projection devices 100 to 111 are arranged successively along the hydraulic distribution bus 3 so as to be connected thereto by way of these hydraulic connection elements 9 in successive separate areas 90, 92. Each projection device thus protrudes into the hydraulic distribution bus as this bus is deployed in the vehicle.

The projection device comprises a mechanical holding element 10 allowing attachment to the hydraulic distribution bus 3. In the example illustrated, the mechanical holding element 10 takes the form of a clamp at least partially surrounding the main hydraulic line that contributes to forming the hydraulic distribution bus 3 common to the plurality of projection devices 100 to 111. There may for example be provision for a holding element with elastic deformation, defining, in its starting position, a groove with dimensions substantially smaller than those of the line defining the distribution bus, the operator then having to force the connection element to deform so as to be able to engage on the hydraulic distribution bus, and the elastic return of the connection element ensuring it is held in position on the bus.

FIG. 3 shows two projection devices including these hydraulic connection elements and these mechanical holding elements interacting with the hydraulic distribution bus 3. One of the projection devices has been shown partially, by making visible only these elements interacting with the hydraulic distribution bus, so as to illustrate the feature according to the invention according to which a hydraulic distribution bus feeds a plurality of distribution devices, each of these devices poking into this hydraulic distribution bus that is then common to the plurality of distribution devices.

In addition to the hydraulic connection, as has just been described, of the projection devices to a common hydraulic distribution bus, and as is visible for one of the projection devices shown in its entirety in FIG. 3, the projection device may be linked hydraulically to the hydraulic distribution bus 3, on the one hand, and to an electronic control bus 11, which is linked electrically to a main electronic unit 200, on the other hand. It will be understood that the same may apply for each of the projection devices illustrated in FIG. 1, such that the electronic control bus is common to all of the projection devices, similarly to the hydraulic distribution bus.

A description will be given hereinafter of a projection device associated with an optical detection system of optical sensor type, it being understood that the features relating to the hydraulic and electrical connection of the projection devices to a common bus may be reproduced for a projection device that is intended to clean a glazed surface such as the windscreen or the rear window.

The projection device may be housed in a housing 12, as illustrated schematically in FIG. 3. The housing 12 moreover comprises an optical detection system 4 that has a glazed surface that the associated projection device 100 to 111 has to clean. Such an optical detection system 4 fitted on the vehicle 1 may be a video camera or else a laser scanner necessary to allow a driving-assistance and/or manoeuvring-assistance device of the vehicle 1 to operate.

When a projection device 100 to 111 is associated with such an optical detection system 4, the latter is configured to communicate via an electronic connection cable 13, separate from the electronic control bus 11 of the projection devices 100 to 111, with a main electronic unit 200 fitted on this vehicle 1. By way of example, when the optical detection system 4 is a camera, this electrical connection cable 13 makes it possible to transmit a video signal to the main electronic unit 200.

The projection devices 100 to 111 of the cleaning system 2 are linked electrically to the electronic control bus 11 independently of one another. The electronic control bus 11 is in this case a LIN bus, it being understood that other communication protocols could be used.

The solenoid valve 7 comprises an electronic driving unit (not shown) for controlling it and an electrical connection terminal 15 configured to allow the projection device, and in particular the solenoid valve, to be connected to the electronic control bus 11. More particularly, a connector 14 is provided on the electronic control bus 11 in order to allow the solenoid valve to be connected to the communication network continuing as far as the next connector and the next associated solenoid valve. The connector 14 is linked, for example by an electrical wire, to a first pin 150 of the electrical connection terminal 15 of the solenoid valve 7. A second pin 151 and a third pin 152 of the electrical connection terminal 15 are provided in order to receive wires coming from a power supply network 16 of the vehicle 1 and allowing an electrical connection to a positive pole 160, for a voltage preferably equal to 12 V, and a zero pole 161 for grounding.

A description will now be given of the operation of a solenoid valve 7 in terms of it being controlled by the electronic control bus 11.

The electronic driving unit for a solenoid valve 7 is linked electrically to the electrical connection terminal 15. This electronic driving unit is programmed to continuously analyse the data transmitted by the electronic control bus 11. When this electronic driving unit identifies an instruction emitted by the main electronic unit 200, transmitted via the electronic control bus 11 and that is dedicated thereto, for example a control instruction to open the solenoid valve 7, it actuates the solenoid valve 7 that is associated therewith and thus allows it to direct the cleaning product contained in the hydraulic distribution bus 3 to the corresponding sprinkler 8.

The projection device then recovers as much cleaning product as is required to clean the associated glazed surface, that is to say the amount of cleaning product flowing through the solenoid valve for the time it is actuated by the electronic driving unit.

FIG. 4 schematically shows the hydraulic distribution bus 3 and the electronic control bus 11 forming a single electric and hydraulic distribution bus 17, which, in accordance with what was described above, is configured to feed a plurality of projection devices 100 to 111. As shown, the electronic control bus 11 is formed jointly with the hydraulic distribution bus 3. FIG. 5 shows a section of this electric and hydraulic distribution bus 17, which in this case is formed such that the hydraulic distribution bus 3 takes the form of an extruded tube within which the cleaning product flows and that bears, on its periphery, at least one additional line for receiving the electronic control bus 11, which is thus positioned peripherally with respect to the hydraulic distribution bus 3.

When a projection device 100 to 111 is linked hydraulically to the hydraulic distribution bus 3, the hydraulic connection element 9 is advantageously positioned on the electric and hydraulic distribution bus 17 so as not to damage the electronic control bus 11.

It will have been understood from reading the above text that the cleaning system according to the invention is advantageous in that it includes at least two cleaning devices positioned at a distance from one another in the vehicle and supplied at least hydraulically by a hydraulic distribution bus that is common to these cleaning devices. The distribution bus is arranged throughout the vehicle so as to route, close to the cleaning devices, the cleaning product necessary for these cleaning devices to operate, and it is noteworthy according to the invention that these cleaning devices draw the cleaning product that is flowing when they are given an operating instruction.

Of course, the features and the variant embodiments of the invention may be combined with one another, in numerous combinations, as long as they are not incompatible or exclusive with respect to one another. It may be possible in particular to contemplate variants of the invention that comprise only a selection of features described below, in isolation from the other features described, if this selection of features is sufficient to confer a technical advantage or to distinguish the invention from the prior art.

The invention claimed is:

1. A system for cleaning at least one glazed surface of a vehicle comprising:
   a hydraulic distribution bus able to allow a cleaning product to flow from a storage tank;
   at least two projection devices for projecting the cleaning product onto the at least one glazed surface; and
   an electronic control bus, the at least two projection devices being linked electrically to the electronic control bus independently of one another,
   wherein the at least two projection devices are linked by hydraulic connection elements to the hydraulic distribution bus, independently of one another and in successive areas of said hydraulic distribution bus;
   wherein the hydraulic connection elements are configured to pierce the hydraulic distribution bus and facilitate passage of the cleaning product from the hydraulic distribution bus to a sprinkler.

2. The cleaning system according to claim 1, further comprising a pump able to supply the hydraulic distribution bus with cleaning product.

3. The cleaning system according to claim 1, wherein the hydraulic distribution bus comprises at least two portions that are arranged on either side of a wall and linked to one another by a hydraulic connector.

4. The cleaning system according to claim 1, wherein at least one of the projection devices comprises elements for mechanical holding on the hydraulic distribution bus.

5. The cleaning system according to claim 1, wherein each of the projection devices comprises a solenoid valve and the sprinkler.

6. The cleaning system according to claim 4, wherein the hydraulic connection element and the mechanical holding element of a projection device are borne by the solenoid valve of this projection device.

7. The cleaning system according to claim 1, wherein at least one of the projection devices is associated with an optical detection system, the projection device and the associated optical detection system being housed in a common housing.

8. The cleaning system according to claim 1, wherein the electronic control bus and the hydraulic distribution bus form one and the same electric and hydraulic distribution bus for the projection devices.

9. A system for cleaning at least one glazed surface of a vehicle comprising:
- a hydraulic distribution bus able to allow a cleaning product to flow from a storage tank;
- at least two devices for projecting the cleaning product onto the at least one glazed surface; and
- a pump able to supply the hydraulic distribution bus with cleaning product,
- wherein at least one first projection device cleans an optical surface of a sensor used for automatic analysis of the road scene,
- wherein at least one second projection device cleans a glazed surface of the passenger compartment or an optical surface of a sensor used only for direct analysis by the driver of the vehicle, and
- wherein the hydraulic distribution bus is arranged such that the at least one second projection device is positioned on the hydraulic distribution bus, common to each of the projection devices, so as to be further away from an output of the pump supplying this hydraulic distribution bus than the at least one first projection device is.

* * * * *